United States Patent
O'Dell et al.

(10) Patent No.: US 11,347,494 B2
(45) Date of Patent: May 31, 2022

(54) INSTALLING PATCHES DURING UPGRADES

(71) Applicant: EMC IP Holding Company LLC, Hopkinton, MA (US)

(72) Inventors: Jared O'Dell, Tacoma, WA (US); Gene W. Lee, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/714,040

(22) Filed: Dec. 13, 2019

(65) Prior Publication Data
US 2021/0182047 A1 Jun. 17, 2021

(51) Int. Cl.
*G06F 8/65* (2018.01)

(52) U.S. Cl.
CPC ...................... *G06F 8/65* (2013.01)

(58) Field of Classification Search
USPC ........................................................ 717/171
See application file for complete search history.

(56) References Cited

U.S. PATENT DOCUMENTS

| | | | |
|---|---|---|---|
| 6,161,218 A | 12/2000 | Taylor | |
| 6,477,703 B1 | 11/2002 | Smith et al. | |
| 7,823,148 B2 | 10/2010 | Deshpande et al. | |
| 7,934,211 B2 | 4/2011 | Nguyen et al. | |
| 8,387,037 B2 * | 2/2013 | Henseler | G06F 8/63 717/168 |
| 8,677,348 B1 | 3/2014 | Ramanathpura et al. | |
| 8,893,106 B2 | 11/2014 | Ningombam et al. | |
| 10,289,400 B2 * | 5/2019 | De Zaeytijd | G06F 9/5072 |
| 2003/0218628 A1 | 11/2003 | Deshpande et al. | |
| 2003/0221190 A1 | 11/2003 | Deshpande et al. | |
| 2007/0006209 A1 | 1/2007 | Nguyen et al. | |
| 2007/0288423 A1 | 12/2007 | Kimoto | |
| 2008/0263535 A1 | 10/2008 | Dias et al. | |
| 2010/0257517 A1 | 10/2010 | Sriram et al. | |
| 2011/0225575 A1 | 9/2011 | Ningombam et al. | |
| 2013/0111458 A1 | 5/2013 | Quin et al. | |
| 2013/0125109 A1 | 5/2013 | Scian et al. | |
| 2014/0376362 A1 * | 12/2014 | Selvaraj | H04L 41/0846 370/221 |
| 2015/0142728 A1 * | 5/2015 | Nigam | G06F 8/65 707/609 |

(Continued)

OTHER PUBLICATIONS

"Upgrade Methods and Strategies | Upgrading Clusters"; OpenShift.com website [full url in ref.] as captured by the Wayback Machine Internet Archive (archive.org) on Jul. 16, 2019 (Year: 2019).*

(Continued)

*Primary Examiner* — Qing Chen
*Assistant Examiner* — Clint Thatcher
(74) *Attorney, Agent, or Firm* — Amin, Turocy & Watson, LLP

(57) ABSTRACT

Techniques are provided for installing patches during upgrades. In an example, an administrator specifies an upgrade image and a patch for a computing cluster. The computing cluster verifies compatibility between the upgrade image and the patch, registers the patch, and stores the patch for later use at the cluster level. Then, at the node level, the upgrade image and the patch are applied to each node that is upgraded.

20 Claims, 10 Drawing Sheets

(56) References Cited

U.S. PATENT DOCUMENTS

| | | | |
|---|---|---|---|
| 2016/0342409 A1* | 11/2016 | Acker | G06F 8/65 |
| 2018/0143821 A1 | 5/2018 | Chittigala et al. | |
| 2018/0349130 A1* | 12/2018 | Mohammed | H04L 67/325 |
| 2019/0052732 A1 | 2/2019 | Lee et al. | |
| 2019/0057214 A1 | 2/2019 | Xia et al. | |
| 2019/0146776 A1 | 5/2019 | Chen | |
| 2019/0227787 A1 | 7/2019 | Kumar et al. | |
| 2019/0236164 A1 | 8/2019 | Felts et al. | |
| 2019/0334765 A1* | 10/2019 | Jain | H04L 41/0873 |
| 2020/0097279 A1* | 3/2020 | Mukhopadhyay | G06F 8/65 |
| 2020/0125352 A1* | 4/2020 | Kannan | G06F 8/65 |
| 2020/0356354 A1 | 11/2020 | Mitra | |
| 2020/0379744 A1* | 12/2020 | Bhupati | H04L 67/34 |
| 2021/0055925 A1* | 2/2021 | Zhu | G06F 8/658 |
| 2021/0096956 A1* | 4/2021 | O'Dell | G06F 8/658 |

OTHER PUBLICATIONS

Office Action dated Nov. 24, 2020 for U.S. Appl. No. 16/718,381, 37 pages.
Office Action dated Jan. 1, 2021 for U.S. Appl. No. 16/588,983, 21 pages.
Office Action dated Mar. 10, 2021 for U.S. Appl. No. 16/718,381, 43 pages.
Notice of Allowance dated Jun. 17, 2021 for U.S. Appl. No. 16/588,983, 23 pages.
Office Action dated Jun. 24, 2021 for U.S. Appl. No. 16/718,381, 36 pages.
Office Action dated Nov. 12, 2021 for U.S. Appl. No. 16/718,381, 38 pages.

\* cited by examiner

INSTALLING PATCHES DURING UPGRADES

TECHNICAL FIELD

The present application relates generally to upgrading nodes of a computing cluster.

BACKGROUND

In some examples, a computing cluster can comprise a plurality of computers, referred to as "nodes" or "computing nodes," that can work in concert such that they can be viewed as a single system—the computing cluster. In some examples, a computing cluster can be utilized to implement a distributed file system that organizes a plurality of file shares that are distributed across multiple computing nodes of a computer system. A distributed file system can offer a single namespace across the multiple nodes of the computer system and that can be accessed by a computer that has established a remote session with the distributed file system. A distributed file system can also offer data redundancy via, for example, replicating a file across multiple computing nodes of a computing cluster.

BRIEF DESCRIPTION OF THE DRAWINGS

Numerous aspects, embodiments, objects, and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
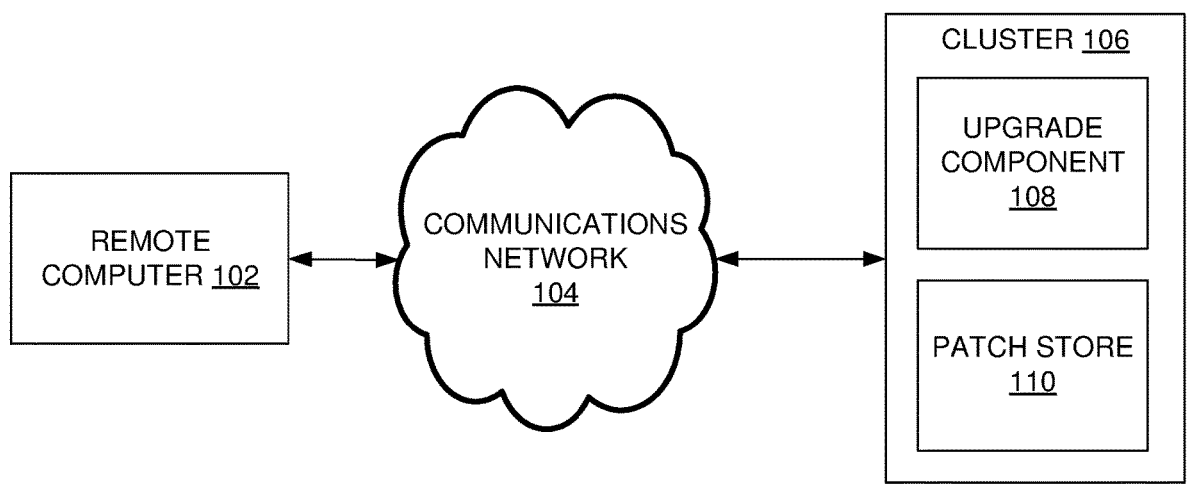
FIG. 1 illustrates a block diagram of an example computer system that can facilitate installing patches during upgrades, in accordance with certain embodiments of this disclosure.

In some examples, full software upgrade images are released periodically, while patches to update those images are released much more frequently. For customers that need up upgrade and then apply an additional patch, it can take a lot of time to complete both operations across all nodes in a large computing cluster. The present techniques can be utilized to install both an upgrade image and a patch at the same time.

That is, a customer can perform an upgrade to a computing cluster and a cumulative roll-up patch installation at the same time, and as a single operation. This allows a customer to start one update operation that performs both software updates—i.e., a full system image and additional patch fixes. Since this is a single operation, in some examples, no further cluster interaction is needed to update all nodes to the latest software version and patch level. Additionally, performing both operations together can allow the full update to be completed faster than if the two were performed separately.

This speed increase can be, in part, because there is no delay for waiting for an administrator to begin a second process of installing the patch, and also, in part, because of a reduced overhead to the upgrade system. In a clustered system, there can be some amount of wasted time in coordinating processes between nodes. By performing a patch installation in an already-running upgrade, there can be fewer steps to coordinate between the nodes, and therefore less wasted time to coordinate steps that are not implemented compared to previous techniques.

In some examples according to the present techniques, an upgrade can be implemented as follows. A customer specifies an upgrade image and a single patch. A system determines if the provided patch is compatible with the provided upgrade image. If compatible, the patch can be registered to be installed, and stored for later use. The upgrade process can start up and upgrade one or more nodes. As part of the upgrade process, the upgrade image can be deployed to a node, and the node is rebooted. After the node is rebooted, the node starts up on the new version of the software from the upgrade image, but without the patch installed. Once the node is running on the new eversion, the system can run a patch reconciliation process on the upgraded node. Additional nodes can then be upgraded.

In some examples, an option can be added to a user interface to permit a customer to specify a patch when initiating an upgrade. For example, in a command line interface, a "—patch-paths" option can be added to enable a customer to specify the patch.

Patch compatibility can be determined based on whether the specified patch is listed as being compatible with the version of the specified upgrade image. Additionally, in examples where only one patch is specified to be installed during the upgrade, the system can verify that the patch does not list any dependencies. This can be performed once per cluster at a time that the customer submits the upgrade request.

Patch registration and storing a patch in a patch catalog can be performed at a point where compatibility is determined. This can be performed once per cluster, at a time that the customer submits the upgrade request.

A patch reconciliation process can evaluate a list of installed patches (i.e., patches that are currently installed) and compare that to the list of registered patches (i.e., patches that should be, but might not be, installed) to determine a list of operations to correct for missing patches. This can be performed once per node at a time that the node reboots into the upgraded version from the upgrade image.

This approach can be compatible with various methods of coordinating an upgrade between a plurality of nodes. This approach can be compatible with a rolling upgrade (i.e., one node at a time), a parallel upgrade (i.e., some nodes at a time), and a simultaneous upgrade (i.e., all nodes at a time).

Companies can distribute a main release and then later distribute smaller updates for that release. Previous approaches do not permit for the simultaneous application of both the main release and smaller updates (i.e., patches) to be specified at the same time. Previous approaches do not permit for smaller updates to be interleaved in an upgrade process across multiple nodes in a clustered system. Previous approaches do not permit for using patch reconciliation to accomplish the installation of smaller updates during a larger upgrade process.

Previously, a customer would need to upgrade the cluster to the latest full release as a single operation. Then, the customer would need to apply the latest cumulative roll-up patch as a second operation. Under previous approaches, for large clusters, with 100 nodes or more, each operation can take several days, and must be completed independently. In addition to the longer total maintenance window required for two operations, an administrator would also need to be available to initiate the second operation for the patch after the first operation for the upgrade has completed.

Example Architectures

FIG. 1 illustrates a block diagram of an example computer system 100 that can facilitate installing patches during upgrades, in accordance with certain embodiments of this disclosure. As depicted, computer system 100 comprises remote computer 102, communications network 104, and computer cluster 106. In turn, computer cluster 106 comprises upgrade component 108 and patch store 110. In some examples, upgrade component 108 can implement aspects of the process flows of FIGS. 6-9 to facilitate installing patches during upgrades. Remote computer 102 and computer cluster 106 are communicatively coupled via communications network 104.

Figure 10:
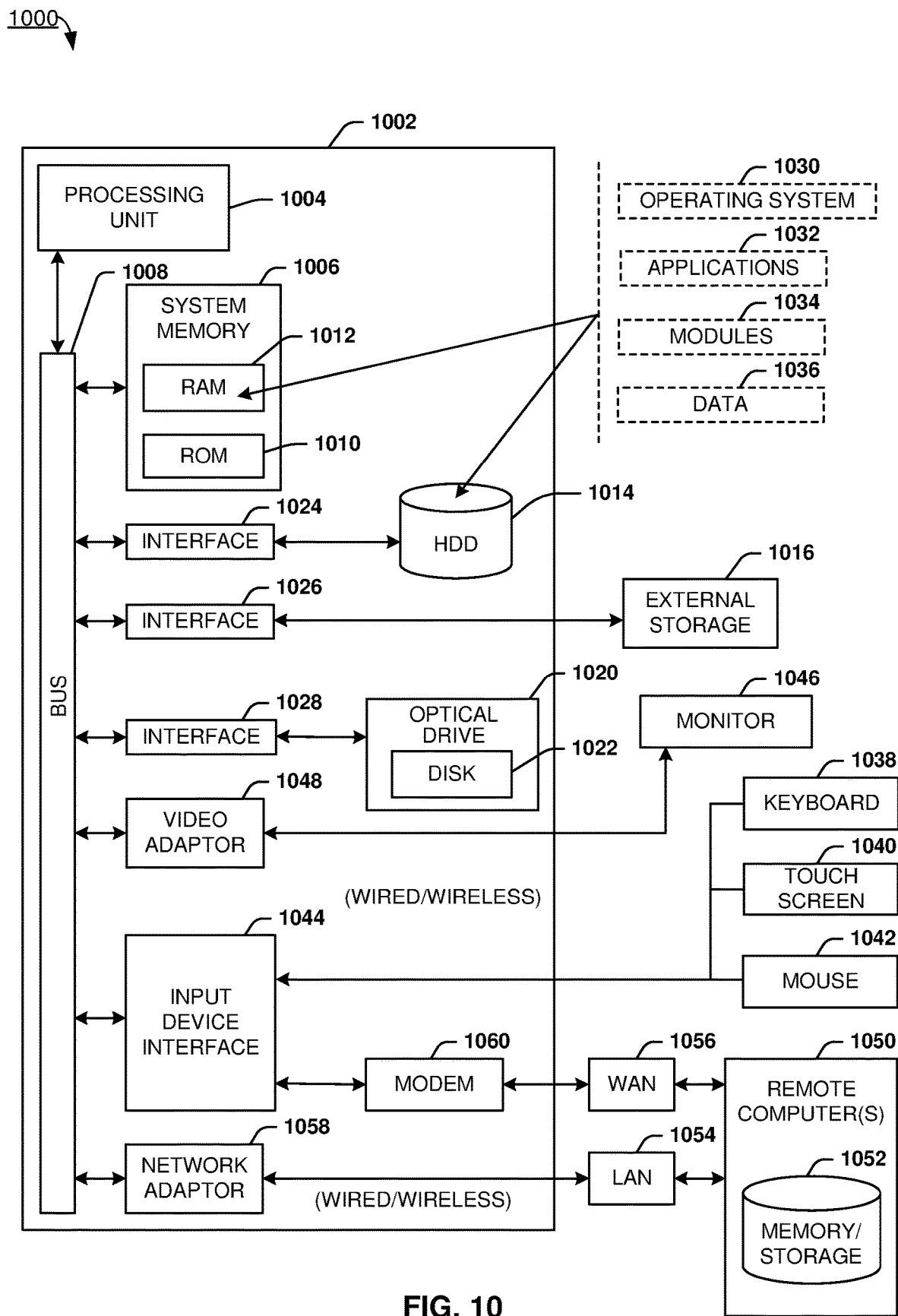
FIG. 10 illustrates an example block diagram of a computer operable to execute certain embodiments of this disclosure.

Each of remote computer 102 and computer cluster 106 can be implemented with aspects of one or more instances of computing environment 1000 of FIG. 10. Communications network 104 can comprise a computer communications network, such as the INTERNET.

Remote computer 102 can indicate to computer cluster 106 that an upgrade is to be performed on one or more nodes of computer cluster 106, and that this upgrade comprises an upgrade image and a patch. For example, an administrator of computer cluster 106 can utilize a command-line user interface of remote computer 102 to indicate this. Remote computer 102 can transmit the upgrade image and the patch to computer cluster 106 via communications network 104. In other examples, the upgrade image and/or the patch can already be stored on computer cluster 106, such as in patch store 110.

Computer cluster 106 (in some examples, specifically upgrade component 108, which can be a process that executes on computer cluster 106) can receive this information from remote computer 102. In response, computer cluster 106 can determine whether the patch and the upgrade image are compatible with each other. If compatible, computer cluster 106 can register the patch to be installed, and store the patch in patch store 110, which can be a computer memory of computer cluster 106.

Computer cluster 106 can perform this compatibility check, and registration and storage of the patch at the cluster level—it can be performed once for computer cluster 106, independent of how many nodes are of computer cluster 106 are to be upgraded. Computer cluster 106 can then begin the upgrade process by installing the upgrade image on one or more nodes. This installation can occur one node at a time (as in FIG. 3), all nodes at once (as in FIG. 4), or some nodes at a time (as in FIG. 5).

As part of the upgrade process for a node, computer cluster 106 deploys the upgrade image to the node, and then reboots the node. After rebooting, a node of computer cluster 106 can start up on the new version of the software indicated by the upgrade image, but without the patch installed.

Once the node is running on the new version of the software indicated by the upgrade image, computer cluster 106 can run a patch reconciliation on the upgraded node. Where appropriate, further nodes can then be upgraded.

Figure 2:
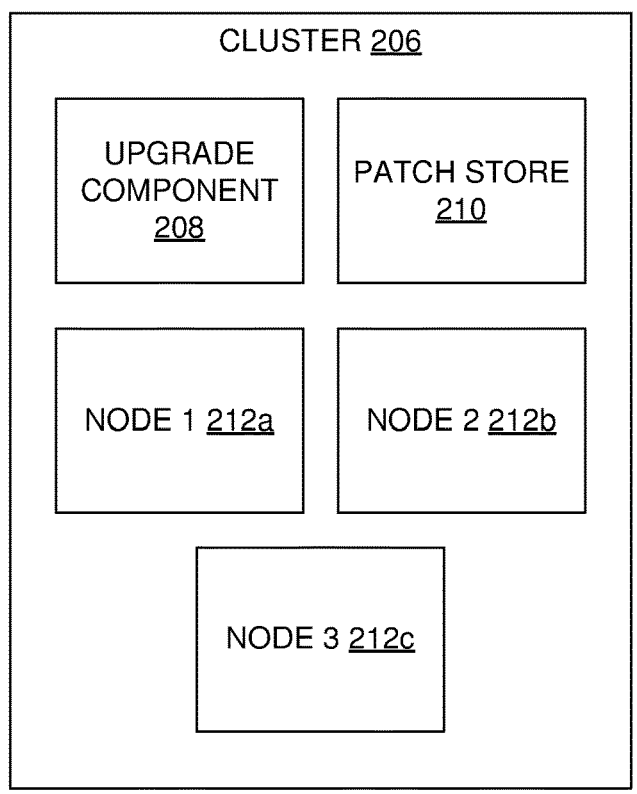
FIG. 2 illustrates another block diagram of an example computer system that can facilitate installing patches during upgrades, in accordance with certain embodiments of this disclosure.

FIG. 2 illustrates another block diagram of an example computer system 200 that can facilitate installing patches during upgrades, in accordance with certain embodiments of this disclosure. As depicted, computer cluster 206 comprises upgrade component 208, patch store 210, node 1 212*a*, node 2 212*b*, and node 3 212*c*. It can be appreciated that there can be example computer clusters that comprise more or fewer than the three nodes (node 1 212*a*, node 2 212*b*, and node 3 212*c*) depicted here.

Computer cluster 206 can be implemented with aspects of one or more instances of computing environment 1000 of FIG. 10. In turn, each of node 1 212*a*, node 2 212*b*, and node 3 212*c* can be implemented with aspects of one or more instances of computing environment 1000 of FIG. 10.

In some examples, computer cluster 206 can be similar to computer cluster 106 of FIG. 1. In some examples, upgrade component 208 can be similar to upgrade component 108 of FIG. 1. In some examples, upgrade component can implement aspects of the process flows of FIGS. 6-9 to facilitate installing patches during upgrades. In some examples, patch store 210 can be similar to patch store 110 of FIG. 1.

Each of node 1 212*a*, node 2 212*b*, and node 3 212*c* can comprise a computing node of a computing cluster. That is, each of node 1 212*a*, node 2 212*b*, and node 3 212*c* can comprise a computer that runs an instance of an operating system, and that is collected with other computing nodes into a computing cluster. A computing cluster can, for example, implement a distributed file system across the nodes of the computing cluster.

In some examples, a distributed file system organizes a plurality of file shares that are distributed across multiple computing nodes of a computer system. A distributed file system can offer a single namespace across the multiple nodes of the computer system and that can be accessed by a computer that has established a remote session with the distributed file system. A distributed file system can also offer data redundancy via, for example, replicating a file across multiple computing nodes of a computer system.

Computing cluster 206 can perform certain operations at the cluster level, and certain operations at the node level. For example, computing cluster 206 can perform a compatibility check for an upgrade image and a patch at the cluster level. Then, when it comes time to apply the upgrade image and the patch, that can be performed at the node level. That is, each node can be independently, or separately, upgraded with the upgrade image and the patch. The upgrade can be considered to be performed independently or separately because it is performed once for each node that is upgraded.

In some examples, computing cluster 206 can upgrade its nodes—here, node 1 212a, node 2 212b, and node 3 212c—at various levels of plurality or seriality. For example, node 1 212a, node 2 212b, and node 3 212c can be upgraded serially, such as described with respect to FIG. 3. In other examples, node 1 212a, node 2 212b, and node 3 212c can be upgraded simultaneously, such as described with respect to FIG. 4. In other examples, node 1 212a, node 2 212b, and node 3 212c can be upgraded such that some but not all are upgraded in parallel, such as described with respect to FIG. 5.

Example Installation Sequences

Figure 3:
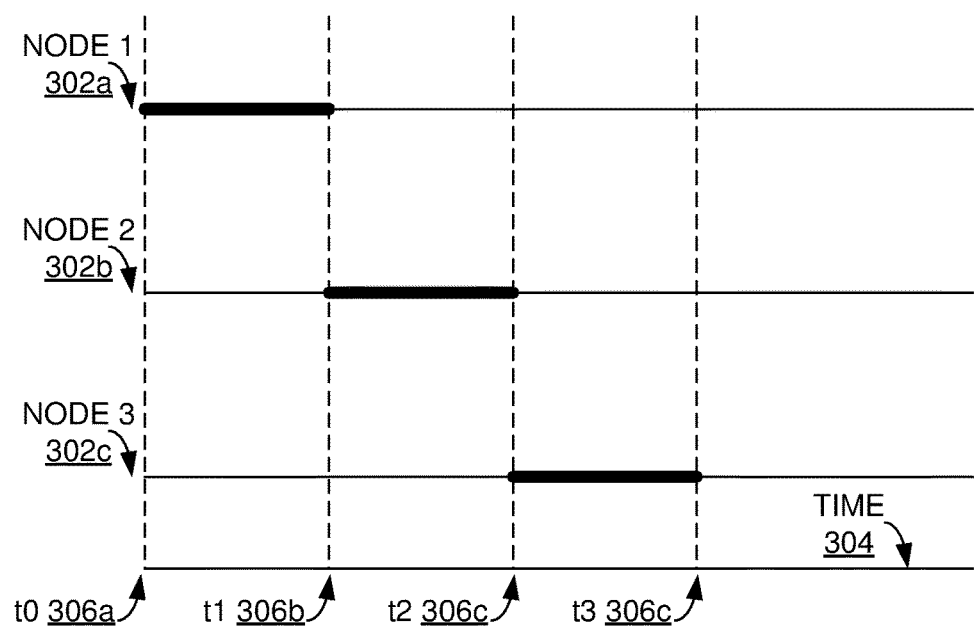
FIG. 3 illustrates a sequence of installing patches during upgrades for one node of a computing cluster at a time, in accordance with certain embodiments of this disclosure.

FIG. 3 illustrates a sequence 300 of installing patches during upgrades for one node of a computing cluster at a time, in accordance with certain embodiments of this disclosure. In sequence 300, three nodes are upgraded along with a patch one at a time, or in series.

The three nodes being upgraded are node 1 302a, node 2 302b, and node 3 302c. In some examples, each of node 1 302a, node 2 302b, and node 3 302c can be similar to node 1 212a, node 2 212b, and node 3 212c, respectively, of FIG. 2. Time 304 is depicted, with various points in time identified time t0 306a, time t1 306b, time t2 306c, and time t3 306d.

Node 1 302a is upgraded starting at time t0 306a and ending at time t1 306b. Once node 1 302a has completed upgrading (including applying a patch), node 2 302b is upgraded starting at time t1 306b and ending at time t2 306c. Once node 2 302b has completed upgrading (including applying a patch), node 3 302c is upgraded starting at time t2 306c and ending at time t3 306d. In this manner, the nodes—node 1 302a, node 2 302b, and node 3 302c—can be upgraded one at a time. In some examples, the nodes can be upgraded one at a time, but there can be a time at which no node is being upgraded. For example, there can be examples where no node is being upgraded between time t1 306b and time t2 306c.

Figure 4:
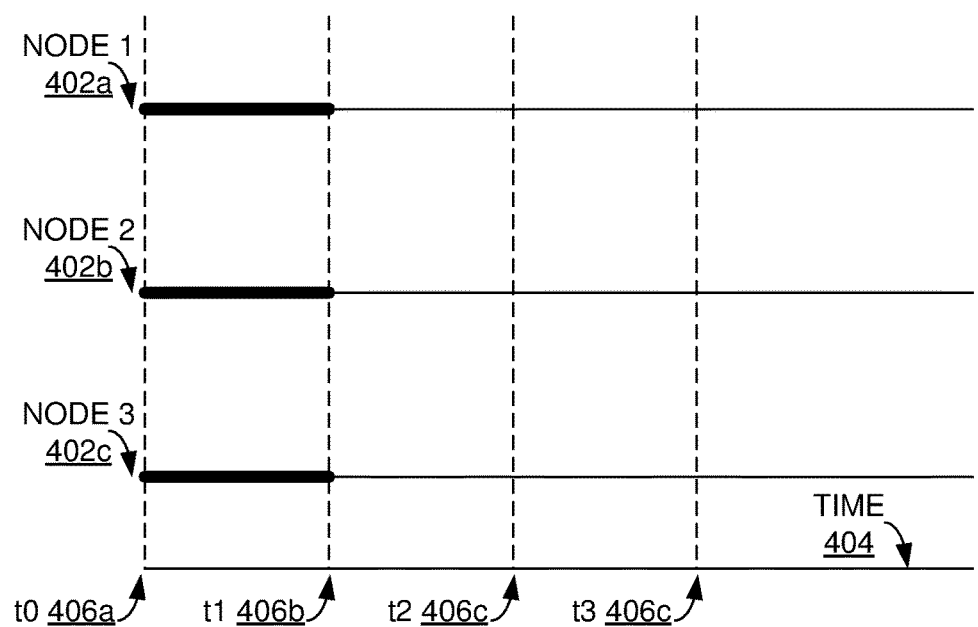
FIG. 4 illustrates a sequence of installing patches during upgrades for all nodes of a computing cluster at a time, in accordance with certain embodiments of this disclosure.

FIG. 4 illustrates a sequence 400 of installing patches during upgrades for all nodes of a computing cluster at a time, in accordance with certain embodiments of this disclosure. In some examples, each of node 1 402a, node 2 402b, and node 3 402c can be similar to node 1 212a, node 2 212b, and node 3 212c, respectively, of FIG. 2. Time 404 is depicted, with various points in time identified time t0 406a, time t1 406b, time t2 406c, and time t3 406d.

In this example, each of node 1 402a, node 2 402b, and node 4 402c are upgraded starting at time t0 406a and ending at time t1 406b. That is, they are all upgraded at the same time. It can be appreciated that it can take different amounts of time to complete an upgrade on different nodes. For example, it could be that node 2 402b is upgraded until time t2 306c. It can also be appreciated that there can be examples where not all nodes have their upgrade started at the exact same time. Rather, upgrading all nodes at the same time can be considered to be there is a time at which all nodes are undergoing some part of the upgrade process, or that an upgrade on a node can begin without regard to whether the other nodes are or are not being upgraded at that time.

Figure 5:
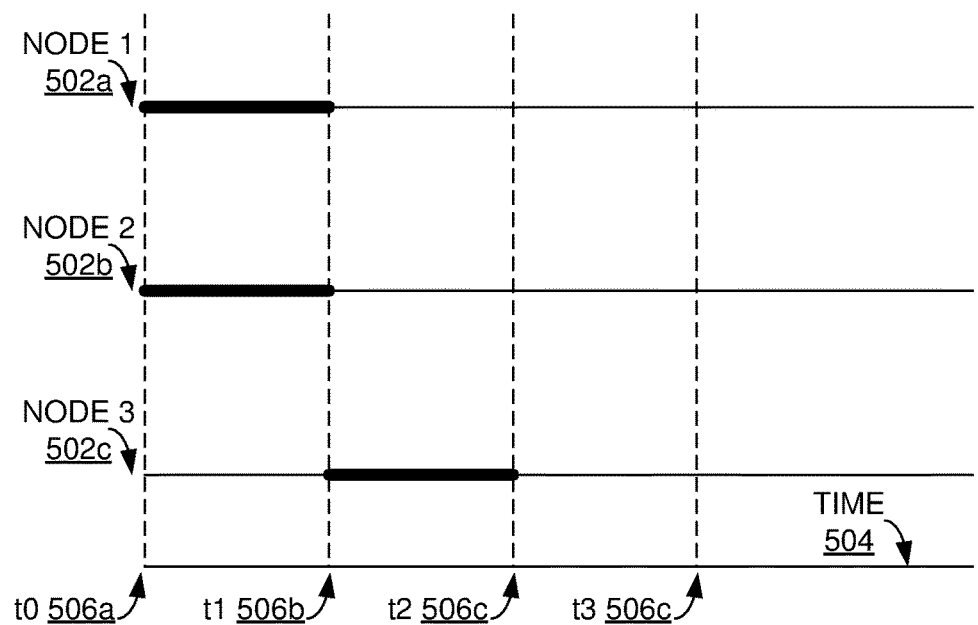
FIG. 5 illustrates a sequence of installing patches during upgrades for some nodes of a computing cluster at a time, in accordance with certain embodiments of this disclosure.

FIG. 5 illustrates a sequence 500 of installing patches during upgrades for some nodes of a computing cluster at a time, in accordance with certain embodiments of this disclosure. In some examples, each of node 1 502a, node 2 502b, and node 5 502c can be similar to node 1 212a, node 2 212b, and node 3 212c, respectively, of FIG. 2 Time 504 is depicted, with various points in time identified time t0 506a, time t1 506b, time t2 506c, and time t3 506d.

Node 1 502a and node 2 502b are upgraded starting at time t0 506a and ending at time t1 506b. Once either node 1 502a or node 2 502b has completed upgrading (including applying a patch), node 3 502c is upgraded starting at time t1 506b and ending at time t2 506c. In this manner, some of the nodes—node 1 502a, node 2 502b, and node 3 502c—can be upgraded at the same time. In this case, two nodes are permitted to be upgraded at the same time, and upgrading a third node (node 3 502c) waits until one of the earlier nodes being upgraded has completed (node 1 502a and node 2 502b).

Similar, to the example of all nodes being upgraded at the same time in FIG. 4, here the nodes do not need to have their upgrade started at the same time, and the upgrades might not end at the same time. This is one example that is shown for the sake of clarity.

Example Process Flows

Figure 6:
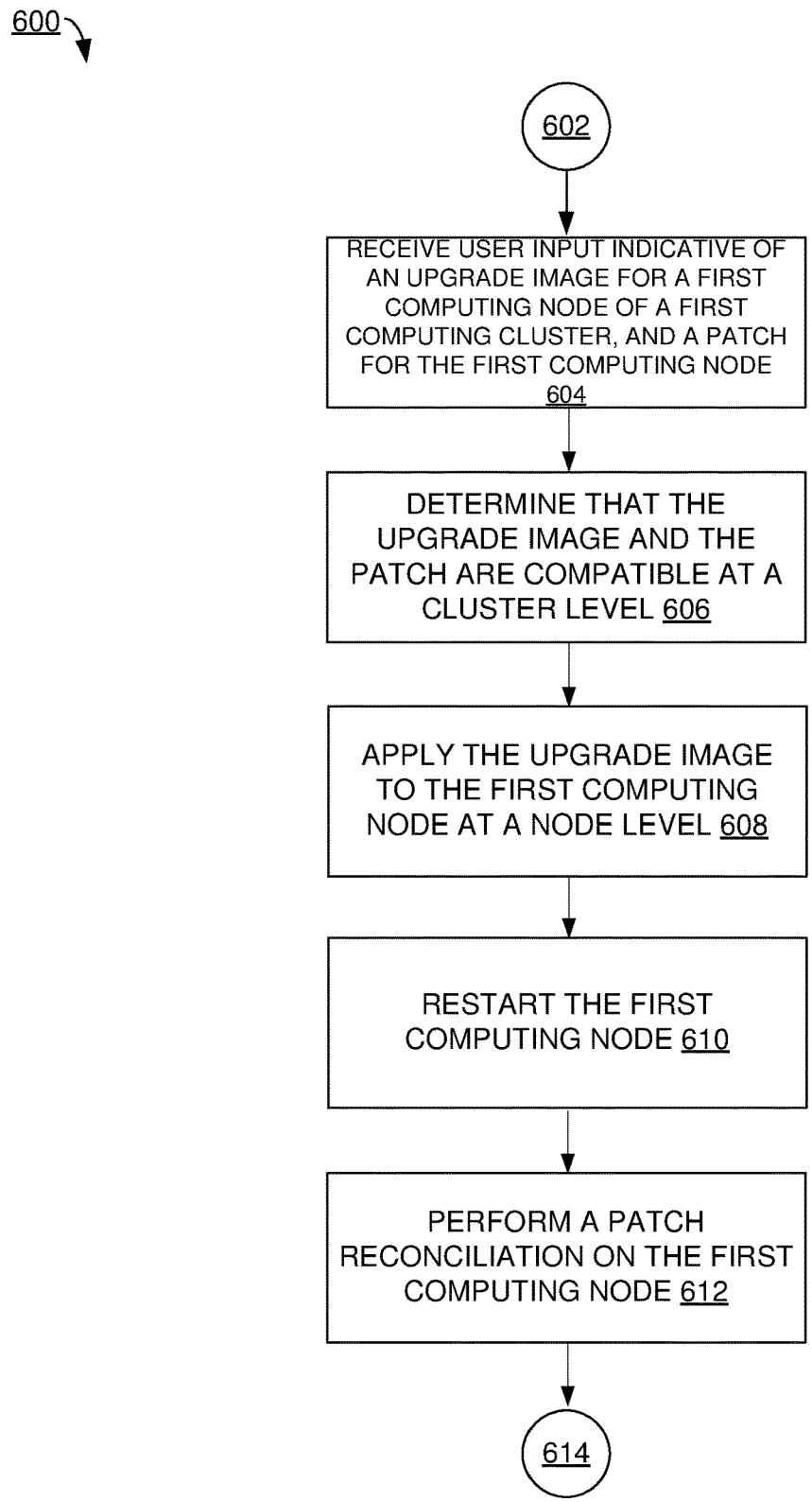
FIG. 6 illustrates an example process flow that can facilitate installing patches during upgrades, in accordance with certain embodiments of this disclosure.

FIG. 6 illustrates an example process flow 600 that can facilitate installing patches during upgrades, in accordance with certain embodiments of this disclosure. In some examples, aspects of process flow 600 can be implemented by upgrade component 108 of FIG. 1, or upgrade component 208 of FIG. 2. It can be appreciated that the operating procedures of process flow 600 are example operating procedures, and that there can be embodiments that implement more or fewer operating procedures than are depicted, or that implement the depicted operating procedures in a different order than as depicted.

Process flow 600 begins with 602, and moves to operation 604. Operation 604 depicts receiving user input indicative of an upgrade image for a first computing node of a first computing cluster, and a patch for the first computing node. In some examples, this user input can be received by upgrades component 108 of FIG. 1 after a user has entered the user input into a user interface of remote computer 102 and it has been transmitted to upgrade component 108 via communications network 104. After operation 604, process flow 600 moves to operation 606.

Operation 606 depicts determining that the upgrade image and the patch are compatible at a cluster level. This can be expressed as determining that an upgrade image and a patch are compatible for a computing cluster. An upgrade image and a patch can be compatible where the patch can be applied to a node after the upgrade image has been applied to the node. Put another way, the upgrade image and the patch can be compatible where the patch is a patch to the upgrade image.

In some examples, operation 606 comprises performing the determining that the upgrade image and the patch are compatible for at least the first computing node and a second computing node of the cluster independently of performing a separate determination for each of the first computing node and the second computing node. This can be another way of expressing that this compatibility check is performed at the cluster level.

In some examples, operation 606 comprises determining that the patch is identified as being compatible with the upgrade image in a data store that identifies compatibility between patches and upgrade images. That is, in some examples, operation 606 can comprise upgrade component 108 storing a list of known versions of upgrade images, and known versions of patches that are compatible with particular versions of upgrade images. Where this stored list indicates that the version of the upgrade image and the version of the patch are compatible, then it can be determined in operation 606 that the upgrade image and the patch are compatible.

In some examples, operation 606 comprises, in response to the determining, registering the patch to be installed for the first computing node. Registering the patch can comprise upgrade component 108 storing an indication that the patch will be applied to a node after the upgrade image is applied to the node.

In some examples, operation 606 comprises in response to the determining, performing the applying the upgrade image to the first computing node and to a second computing node of the first computing cluster. That is, determining compatibility can be performed once per cluster, and then upgrading a node can be performed once for each node. Put another way, some operations can be performed at the cluster level, while other operations can be performed at the node level.

In some examples, operation 606 comprises determining that the patch lacks a dependency. This can also be stated as, determining that there are no dependencies associated with the patch for the computing cluster. That is, in some examples, a maximum of one patch can be installed on a given node as part of implementing process flow 600.

In some examples, operation 606 comprises, in response to the determining that the upgrade image and the patch are compatible at a cluster level, storing the patch in a computer memory, and performing the patch reconciliation (in operation 612) on the first computing node using the patch stored in the computer memory. Storing the patch in a computer memory can comprise upgrade component 108 storing the patch in patch store 210. After operation 606, process flow 600 moves to operation 608.

Operation 608 depicts applying the upgrade image to the first computing node at a node level. This can comprise upgrading some software of the computing node with software contained within the upgrade image.

In some examples, operation 608 comprises applying the upgrade image to a first computing node of the computing cluster and a second computing node of the computing cluster. That is, the act of applying the upgrade image can be performed at a node level, as opposed to at a cluster level.

In some examples, operation 608 comprises applying the upgrade image to a second computing node of the cluster at the node level, wherein the applying the upgrade image to the second computing node is separate from the applying the upgrade image to the first computing node. That is, the operation of applying an upgrade image to a node can be performed at a node level (as opposed to at a cluster level, like with a compatibility check). So, applying the upgrade image can be performed a first time for the first node, and then performed a second time for the second node. After operation 608, process flow 600 moves to operation 610.

Operation 610 depicts restarting the first computing node. Restarting the computing node can comprise upgrade component 208 of FIG. 2 sending an instruction to node 1 212a that node 1 212a is to restart.

In some examples, operation 610 comprises restarting the first computing node and the second computing node. That is, in examples where multiple nodes are upgraded, each node can be restarted in operation 610. After operation 610, process flow 600 moves to operation 612.

Operation 612 depicts performing a patch reconciliation on the first computing node. In some examples, performing a patch reconciliation can comprise evaluating a list of installed patches (i.e., patches that are currently installed) and compare that to the list of registered patches (i.e., patches that should be, but might not be, installed) to determine a list of operations to correct for missing patches. This can be performed once per node at a time that the node reboots into the upgraded version from the upgrade image. In some examples, operation 612 comprises applying the patch to the first computing node.

In some examples, performing a patch reconciliation can be expressed as evaluating one or more previously-installed patches for the first computing node; determining a missing patch based on the one or more previously-installed patches for the first computing node and a registered patch for the first computing node; and determining at least one operation to perform to apply the missing patch to the first computing node.

In some examples, operation 612 comprises performing a patch reconciliation on the first computing node and the second computing node. That is, in examples where multiple computing nodes are upgraded, patch reconciliation can be performed for each node.

In some examples, operation 612 comprises completing the performing patch reconciliation on the first computing node before beginning the applying the upgrade image to a second computing node. That is, upgrades can be applied one node at a time. While this example specifically relates to completing performing patch reconciliation, there can be examples where this is expressed more broadly. Applying an upgrade image to a node, restarting the node, and performing patch reconciliation for the node can be thought of as upgrading the node. In these examples, a node can be undergoing any part of that upgrading process, and the upgrade process will not be initialized for a second node, because the nodes are upgraded one at a time. A similar approach can be taken to upgrading all nodes at once, or upgrading some (but not all) nodes at once.

In some examples, operation 612 comprises performing the applying the upgrade image to the first computing node concurrently with performing the applying the upgrade image to a second computing node. That is, upgrades can be applied all nodes at once.

In some examples, operation 612 comprises completing the performing patch reconciliation on the first computing node (concurrently with performing a patch reconciliation on a second computing node) before beginning to apply the upgrade image to a third computing node of the computing cluster. That is, upgrades can be applied to some (but not all) nodes at once.

After operation 612, process flow 600 moves to 614, where process flow 600 ends.

Figure 7:
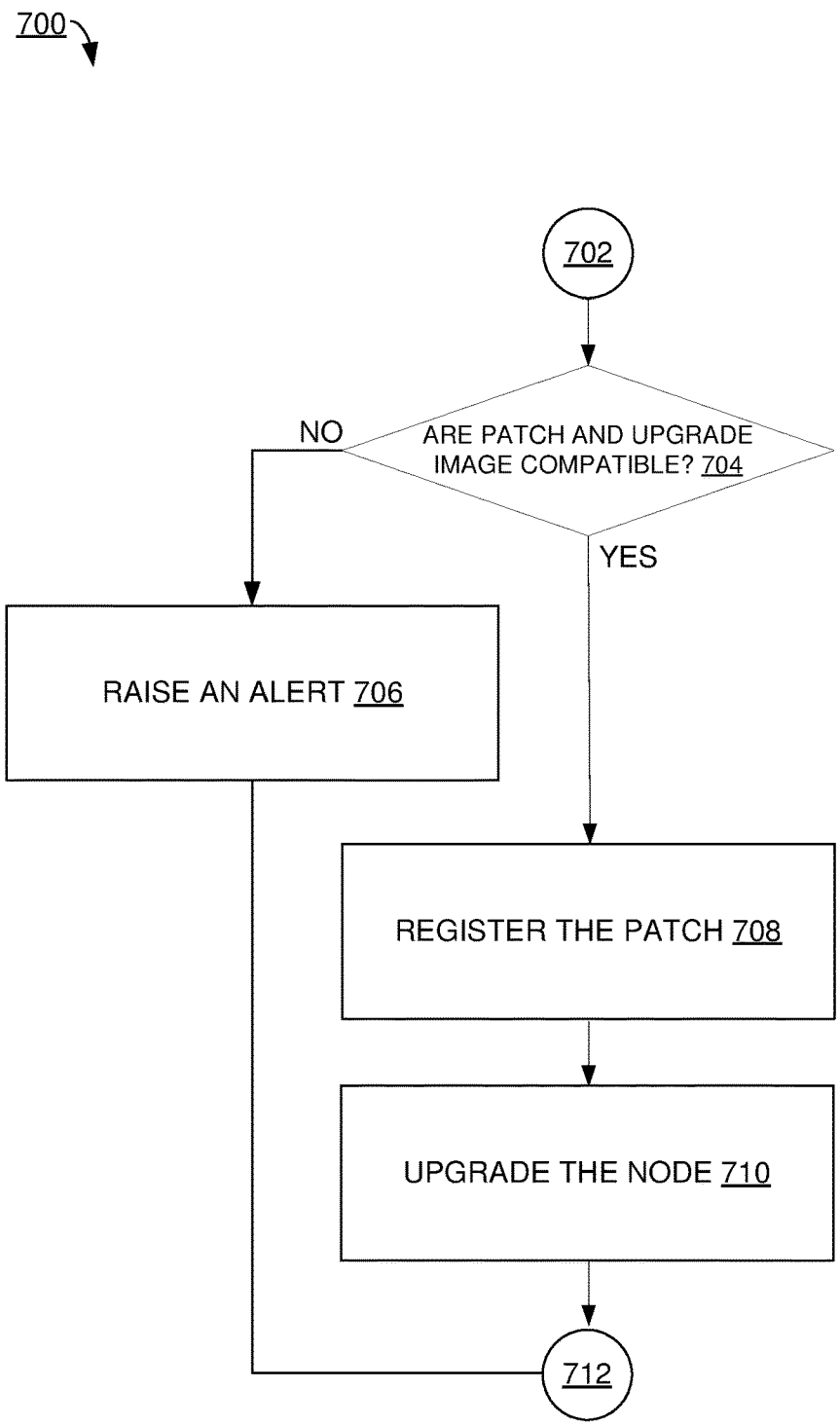
FIG. 7 illustrates an example process flow that can facilitate determining compatibility as part of installing patches during upgrades, in accordance with certain embodiments of this disclosure.

FIG. 7 illustrates an example process flow 700 that can facilitate determining compatibility as part of installing patches during upgrades, in accordance with certain embodiments of this disclosure. In some examples, aspects of process flow 700 can be implemented by upgrade component 108 of FIG. 1, or upgrade component 208 of FIG. 2. It can be appreciated that the operating procedures of process flow 700 are example operating procedures, and that there can be embodiments that implement more or fewer operating procedures than are depicted, or that implement the depicted operating procedures in a different order than as depicted. In some examples, process flow 800 can be implemented to determine compatibility as described with respect to process flow 600 of FIG. 6.

Process flow 700 begins with 702, and then moves to operation 704. Operation 704 depicts determining whether a patch and an upgrade image are compatible. In some examples, this operation can be performed once per cluster at the time that an administrator indicates to upgrade one or more nodes of the cluster with an upgrade image and a patch. In some examples, operation 704 can be implemented in a similar manner as operation 606 of FIG. 6.

Where in operation 704 it is determined that a patch and an upgrade image are compatible, then process flow 700 moves to operation 708. Instead, where in operation 704 it is determined that a patch and an upgrade image are incompatible, then process flow 700 moves to operation 706.

Operation 706 is reached from operation 704 where it is determined in operation 704 that the patch and the upgrade image are incompatible. Operation 706 depicts raising an alert. Raising an alert can comprise presenting an indication that the upgrade image and the patch are incompatible in a user interface utilized by an administrator who began the failed update.

For example, where an administrator utilizes a user interface of remote computer 102 of FIG. 1 to begin an update, raising an alert can comprise presenting information in that user interface of remote computer 102 that the update will not be completed because the patch and the upgrade image are incompatible. After operation 706, process flow 700 moves to 712, where process flow 700 ends.

Operation 708 is reached from operation 704 where it is determined in operation 704 that the patch and the upgrade image are compatible. Operation 708 depicts registering the patch. Registering the patch can comprise upgrade component 108 storing an indication that the patch will be applied to a node after the upgrade image is applied to the node. After operation 708, process flow 700 moves to operation 710.

Operation 710 depicts upgrading the node. In some examples, operation 710 can be implemented in a similar manner as operation 608 (applying the upgrade image to the node), operation 610 (restarting the node), and operation 612 (performing a patch reconciliation) of FIG. 6. After operation 710, process flow 700 moves to 712, where process flow 700 ends.

Figure 8:
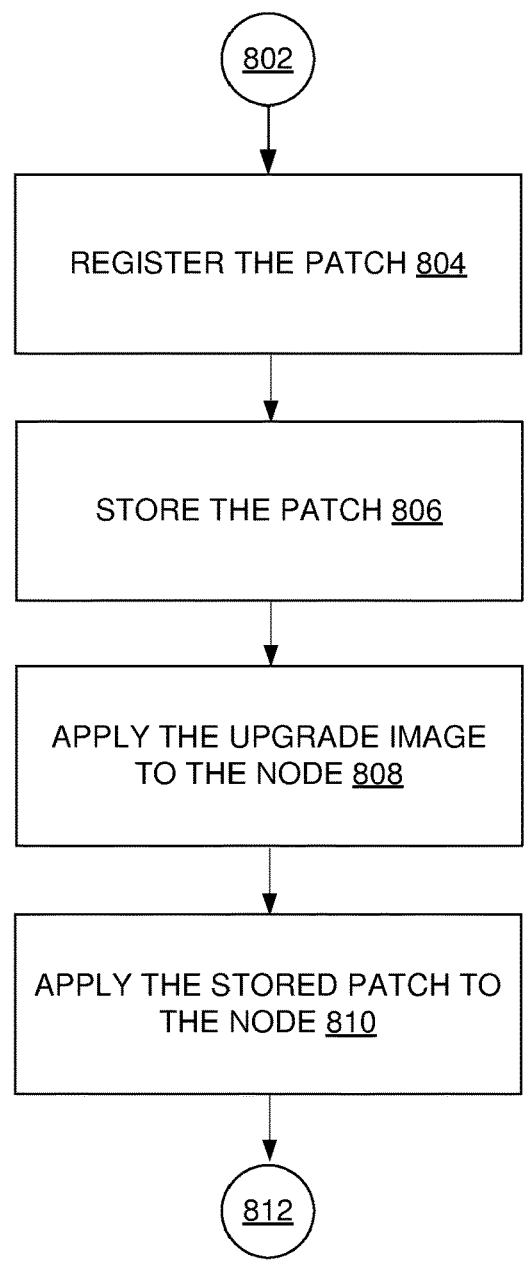
FIG. 8 illustrates another example process flow that can facilitate registering a patch as part of installing patches during upgrades, in accordance with certain embodiments of this disclosure.

FIG. 8 illustrates another example process flow 800 that can facilitate registering a patch as part of installing patches during upgrades, in accordance with certain embodiments of this disclosure. In some examples, aspects of process flow 800 can be implemented by upgrade component 108 of FIG. 1, or upgrade component 208 of FIG. 2. It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented to register a patch as described with respect to process flow 600 of FIG. 6.

Process flow 800 begins with 802 and moves to operation 804. Operation 804 depicts registering the patch. Registering the patch can comprise upgrade component 108 storing an indication that the patch will be applied to a node after the upgrade image is applied to the node. After operation 804, process flow 800 moves to operation 806.

Operation 806 depicts storing the patch. In some examples, storing the patch comprises upgrade component 208 of FIG. 2 storing the patch in patch store 210 of FIG. 2. After operation 806, process flow 800 moves to operation 808.

Operation 808 depicts applying the upgrade image to the node. In some examples, operation 808 can be implemented in a similar manner as operation 608 of FIG. 6. After operation 808, process flow 800 moves to operation 810.

Operation 810 depicts applying the stored patch to the node. In some examples, operation 810 can be implemented in a similar manner as operation 612 of FIG. 6. After operation 810, process flow 800 moves to 812, where process flow 800 ends.

Figure 9:
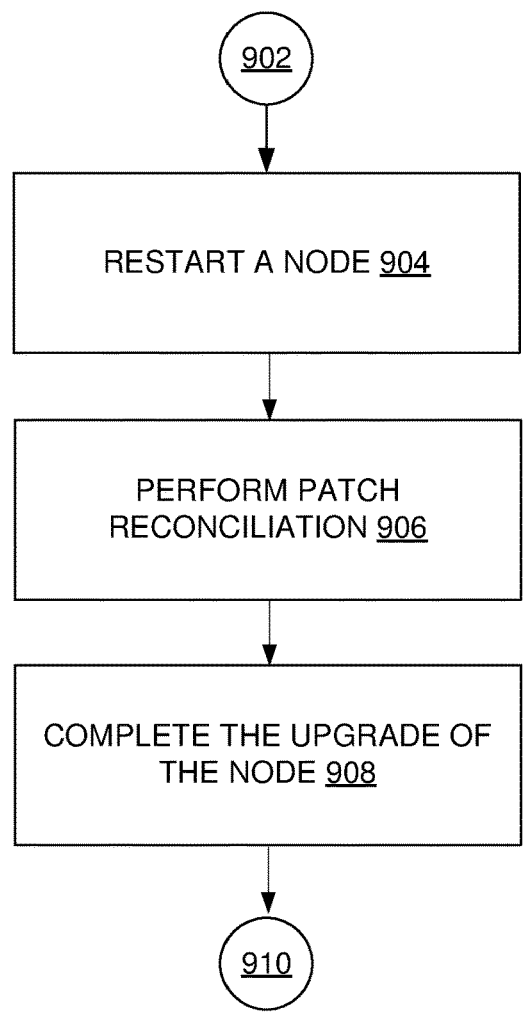
FIG. 9 illustrates another example process flow that can facilitate a patch reconciliation process as part of installing patches during upgrades, in accordance with certain embodiments of this disclosure.

FIG. 9 illustrates another example process flow 900 that can facilitate a patch reconciliation process as part of installing patches during upgrades, in accordance with certain embodiments of this disclosure. In some examples, aspects of process flow 900 can be implemented by upgrade component 108 of FIG. 1, or upgrade component 208 of FIG. 2. It can be appreciated that the operating procedures of process flow 900 are example operating procedures, and that there can be embodiments that implement more or fewer operating procedures than are depicted, or that implement the depicted operating procedures in a different order than as depicted. In some examples, process flow 800 can be implemented for patch reconciliation as described with respect to process flow 600 of FIG. 6.

Process flow 900 begins with 902 and moves to operation 904. Operation 904 depicts restarting a node. In some examples, restarting a node comprises upgrade component 208 of FIG. 8 sending an instruction to node 1 212a of FIG. 2 for node 1 212a of FIG. 2 to restart, and node 1 212a restarting in response. After operation 904, process flow 900 moves to operation 906.

Operation 906 depicts performing patch reconciliation. In some examples, performing a patch reconciliation can comprise evaluating a list of installed patches (i.e., patches that are currently installed) and compare that to the list of registered patches (i.e., patches that should be, but might not be, installed) to determine a list of operations to correct for missing patches. This can be performed once per node at a time that the node reboots into the upgraded version from the upgrade image. After operation 906, process flow 900 moves to operation 908.

Operation 908 depicts completing the upgrade of the node. In some examples, completing the upgrade of the node comprises upgrade component 208 of FIG. 2 verifying that node 1 212a of FIG. 2 has been upgraded with both the upgrade image and the patch, and that node 1 212a of FIG. 2 is operating properly. After operation 908, process flow 900 moves to 910, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented. For example, aspects of computing environment 1000 can be used to implement aspects of remote computer 102 and/or computing cluster 106 of FIG. 1, and/or prediction computing cluster 206, node 1 212a, node 2 212b, and/or node 3 212c of FIG. 2. In some examples, computing environment 1000 can implement aspects of the process flows of FIGS. 6-9 to facilitate installing patches during upgrades.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a first user input indicative of an upgrade image for a first computing node of a first computing cluster, and a patch for the first computing node,
in response to the receiving of the first user input and the patch, before installing the upgrade image, determining that the upgrade image and the patch are compatible at a cluster level based on an analysis of a dependency of the patch, resulting in a determination of cluster compatibility installing the upgrade image to the first computing node at a node level,
restarting the first computing node,
performing a patch reconciliation on the first computing node, comprising:
identifying a first group of patches previously applied to the first computing node, and
comparing the first group to a second group of patches designated to be applied to the first computing node, resulting in a third group of designated patches that have not been applied to the first computing node, and
based on the patch reconciliation, applying the patch to the first computing node.

2. The system of claim 1, wherein the operations further comprise:
based on the determination of cluster compatibility, and before installing the upgrade image on the first computing node, storing an indication that the patch is to be applied to the first computing node after the upgrade image is installed on the first computing node.

3. The system of claim 1, wherein installing the upgrade image comprises:
based on the determination of cluster compatibility, installing in parallel, the upgrade image to the first computing node and to a second computing node of the first computing cluster.

4. The system of claim 1, wherein the dependency of the patch comprises a dependency on another patch.

5. The system of claim 1, wherein the determining that the upgrade image and the patch are compatible at the cluster level comprises:
determining that the upgrade image and the patch are compatible for the first computing node and a second computing node of the first computing cluster independently of performing a respective separate determination of compatibility for the first computing node and the second computing node.

6. The system of claim 1, wherein the operations further comprise:
installing the upgrade image to a second computing node of the first computing cluster at the node level, wherein the installing of the upgrade image to the second computing node is separate from the performing the installing of the upgrade image to the first computing node.

7. A method, comprising:
receiving, by a system comprising a processor, user input indicative of an upgrade image and a patch; and
in response to receiving the user input indicative of the upgrade image and the patch before the upgrade image has been applied,
determining, by the system, that the upgrade image and the patch are compatible for a computing cluster based on analyzing a dependency of the patch, resulting in a determination of cluster compatibility;
applying, by the system, the upgrade image to a first computing node of the computing cluster and a second computing node of the computing cluster;
restarting, by the system, the first computing node and the second computing node; and
performing, by the system, a patch reconciliation on the first computing node and the second computing node, comprising:
identifying a first group of patches previously applied to the first computing node, and
comparing the first group to a second group of patches designated to be applied to the first computing node, resulting in a third group of designated patches that have not been applied to the first computing node; and
based on the patch reconciliation, applying the patch to the first computing node and the second computing node.

8. The method of claim 7, further comprising:
completing, by the system, the performing the patch reconciliation on the first computing node before beginning the applying the upgrade image to the second computing node.

9. The method of claim 7, wherein applying the update image comprises:
applying the upgrade image to the first computing node concurrently with applying the upgrade image to the second computing node.

10. The method of claim 9, further comprising:
completing, by the system, the performing of the patch reconciliation on the first computing node before applying the upgrade image to a third computing node of the computing cluster.

11. The method of claim 7, further comprising:
in response to the determining that the upgrade image and the patch are compatible for the computing cluster, registering, by the system, the patch to be applied.

12. The method of claim 7, wherein the dependency of the patch comprises a dependency on another patch.

13. The method of claim 7, further comprising:
based on the third list,
determining a missing designated patch that has not been applied to the first computing node, and
applying the missing designated patch to the first computing node.

14. A non-transitory computer-readable medium comprising instructions that, in response to execution, cause a system comprising a processor to perform operations, comprising:
in response to receiving a user input indicative of an upgrade image and a patch before the upgrade image has been applied,
determining that the upgrade image and the patch are compatible at a cluster level of a computing cluster based on an analysis of a dependency of the patch;
applying the upgrade image to a first computing node at a node level;
restarting the first computing node; and
performing a patch reconciliation on the first computing node, comprising:
identifying a first group of patches previously applied to the first computing node, and
comparing the first group to a second group of patches designated to be applied to the first computing node, resulting in a third group of designated patches that have not been applied to the first computing node; and
based on the patch reconciliation, applying the patch to the first computing node and the second computing node.

15. The non-transitory computer-readable medium of claim 14, wherein the operations further comprise:
in response to the determining that the upgrade image and the patch are compatible at the cluster level, storing the patch in a computer memory, wherein the performing of the patch reconciliation comprises performing the patch reconciliation on the first computing node using the patch stored in the computer memory.

16. The non-transitory computer-readable medium of claim 14, wherein the determining comprises:
   determining that the patch is identified as being compatible with the upgrade image is further based on compatibility information in a data store that identifies compatibility between patches and upgrade images.

17. The non-transitory computer-readable medium of claim 14, wherein the operations further comprise:
   in response to the determining, applying the upgrade image to the first computing node and to a second computing node of the computing cluster.

18. The non-transitory computer-readable medium of claim 14, wherein the determining comprises:
   determining that the patch is identified as being compatible with the upgrade image further based on compatibility information in a data store that identifies compatibility between patches and upgrade images.

19. The non-transitory computer-readable medium of claim 14, wherein
   the comparing comprises comparing independent of a number of computing nodes of the computing cluster.

20. The system of claim 1, wherein determining that the patch is identified as being compatible with the upgrade image is further based on compatibility information in a data store that identifies compatibility between patches and upgrade images.

* * * * *